(12) United States Patent
Lee et al.

(10) Patent No.: US 12,451,721 B2
(45) Date of Patent: Oct. 21, 2025

(54) SOLAR AND BATTERY POWERED LONG LASTING TRACKER

(71) Applicant: Nano and Advanced Materials Institute Limited, Hong Kong (HK)

(72) Inventors: Cheuk Yin Lee, Hong Kong (HK); Yam Chong, Hong Kong (HK); Shengbo Lu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 328 days.

(21) Appl. No.: 18/319,493

(22) Filed: May 18, 2023

(65) Prior Publication Data

US 2023/0378800 A1   Nov. 23, 2023

Related U.S. Application Data

(60) Provisional application No. 63/344,050, filed on May 20, 2022.

(51) Int. Cl.
*H02J 7/35* (2006.01)
*H02J 7/00* (2006.01)
*G01S 19/00* (2010.01)

(52) U.S. Cl.
CPC .......... *H02J 7/35* (2013.01); *H02J 7/00304* (2020.01); *H02J 7/00308* (2020.01);
(Continued)

(58) Field of Classification Search
None
See application file for complete search history.

(56) References Cited

U.S. PATENT DOCUMENTS 9,839,088 B1 * 12/2017 Deaton ................. H05B 47/13
11,888,387 B2 * 1/2024 Adest ..................... H02J 1/102
(Continued)

OTHER PUBLICATIONS

Solar Powered GPS Asset Tracker—Piccolo ATX2S, WirelessLinks URL: https://wlius.com/telematics-gps-devices/solar-powered-gps-tracker/ Downloaded on Aug. 31, 2023.
(Continued)

*Primary Examiner* — Vladimir Magloire
*Assistant Examiner* — Ashley Brown Raynal
(74) *Attorney, Agent, or Firm* — IDEA Intellectual Limited; Sam T. Yip (57) ABSTRACT

A solar-powered position tracker includes a load including one or more of a GPS module, a GPS antenna, a GSM module, or a GSM antenna. The load is powered by a rechargeable battery, which may be charged by one or more of a non-rechargeable primary battery and a solar cell. The solar-powered position tracker includes a battery management system for powering the position tracker by controlling the solar cell, rechargeable battery and the non-rechargeable primary battery. The two-stage battery management system charges the rechargeable battery in two stages and includes a solar management and protection circuit interconnecting the solar cell, and the rechargeable battery. The battery management system is configured to execute a charging process for recharging the rechargeable battery from solar cell and protect the rechargeable battery under a high pulse current discharge process to meet a high current or high pulse current discharge demand by the load.

9 Claims, 13 Drawing Sheets

(52) U.S. Cl.
CPC ......... *H02J 7/007182* (2020.01); *G01S 19/00* (2013.01); *H02J 2207/20* (2020.01)

(56) References Cited

U.S. PATENT DOCUMENTS

| | | | |
|---|---|---|---|
| 2018/0226697 A1* | 8/2018 | Edwards | H01M 10/0525 |
| 2019/0078347 A1* | 3/2019 | Gharabegian | A01M 29/18 |
| 2019/0393826 A1* | 12/2019 | Lai | H02S 40/32 |

OTHER PUBLICATIONS

GPS Fleet Tracking, Asset Tracking, Fleet Management, Automile URL: https://www.automile.com/tracker-solar Downloaded on Aug. 31, 2023.

* cited by examiner

SOLAR AND BATTERY POWERED LONG LASTING TRACKER

CROSS-REFERENCE TO RELATED APPLICATIONS

This application claims priority to U.S. provisional patent application 63/344,050 filed on 20 May 2022, the disclosure of which is incorporated by reference herein.

FIELD OF THE INVENTION

The present invention generally relates to the field of solar and battery powered position tracker.

BACKGROUND OF THE INVENTION

Position trackers, such as a Global Positioning System (GPS) tracker, require high pulse current in their operations. These high pulse current demands of the loads usually happen in events such as the periodic system "wake up" to receive GPS signals and transmissions of position data signal. Because of the mobile nature of such position trackers, they are usually battery powered. Some may use solar power for sustained operations. With solar cells, however, a secondary rechargeable battery (charged by the solar cell) is also needed to meet the aforesaid high pulse current demands and day-and-night operations of the position trackers. One problem with this solar cell-secondary rechargeable battery configuration is its poor charge and discharge rate under low temperature. For solar powered position trackers to be operable under all time and weather conditions, a solution is needed.

SUMMARY OF THE INVENTION

It is an objective of the present invention to provide a solar-energy powered position tracker having a battery system and battery management system that is capable of providing high pulse current discharges to its loads, such as the GPS and/or Global System for Mobile Communications (GSM) modules and antennas of the position tracker, even under extreme operating ambient temperatures ranging from −30° C. to +85° C.

In one aspect, the solar-powered position tracker includes a load including one or more of a GPS module, a GPS antenna, a GSM module, or a GSM antenna. The load is powered by a rechargeable battery, which may be charged by or more of a non-rechargeable primary battery and a solar cell.

The solar-powered position tracker further includes a battery management system for powering the position tracker by controlling the solar cell, rechargeable battery and the non-rechargeable primary battery The two-stage battery management system charges the rechargeable battery in two stages and includes a solar management and protection circuit interconnecting the solar cell, and the rechargeable battery. The battery management system is configured to execute a charging process for recharging the rechargeable battery from solar cell and protect the rechargeable battery under a high pulse current discharge process to meet a high current or high pulse current discharge demand by the load.

In one embodiment, the primary battery cells are of lithium-thionyl chloride ($Li/SOCL_2$) type, which is a high-capacity and stable power source rated for extreme operating ambient temperatures ranging from −55° C. to +85° C. On the other hand, the Li-ion rechargeable battery cells are capable of providing high C-rate (i.e., 0.1 C-rate to 15 C-rate of the battery cell capacity) pulse discharges in extreme operating ambient temperatures ranging from −40° C. to 85° C. The step-up regulator circuit is configured to direct the flow of electrical current to charge the Li-ion rechargeable battery cells from the non-rechargeable primary battery cells when the Li-ion rechargeable battery cells fall below a low voltage threshold.

In accordance to one aspect of the present invention, the battery system provides a two-stage charging process for recharging the Li-ion rechargeable battery cells. In one embodiment, the step-up regulator circuit is configured to charge the Li-ion rechargeable battery cells from the non-rechargeable primary battery cells until the Li-ion rechargeable battery cells reach a partially-charged voltage threshold indicating that the Li-ion rechargeable battery cells are not yet fully charged. The step-up regulator circuit is then switched to direct the flow of electrical current from one or more solar cells to charge Li-ion rechargeable battery cells for the remaining capacity until they are fully charged.

This way, the present invention provides the technical advantage in that it provides a short charging time for charging-up the Li-ion rechargeable battery cells from the primary battery cells when the capacity of the Li-ion rechargeable battery cells falls below a low level back to a higher level suitable for powering the loads, then allow a long charging time to charge the Li-ion rechargeable battery cells to full capacity using solar cells, allowing the continuous and stable supply of power to the loads. Compared to existing commercial systems, the battery system in accordance with the embodiments of the present invention can provide more capacity in temporally energy storage for solar cells and maximize the effectiveness of usage solar energy.

In accordance to another aspect of the present invention, the battery system further comprises one or more solar cells and a solar cell management and protection circuit configured for charging the Li-ion rechargeable battery cells in the battery system by the solar cells and powering the loads. The solar cell management and protection circuit comprises an ultra-low power DC-DC boost converter, a programmable dynamic maximum power point tracking controller, an under-voltage protection circuit, and an overvoltage protection circuit.

The DC-DC boost converter is configured for the continuous energy harvesting from the solar cells, and its input connection to the solar cells is controlled by the programmable dynamic maximum power point tracking controller. The output of the DC-DC boost converter is connected to the Li-ion rechargeable battery cells in the battery system.

The programmable dynamic maximum power point tracking controller is configured to track and maintain a maximum power point for the energy transfer from solar cells to the Li-ion rechargeable battery cells by continuously monitoring and maintaining the solar cells' voltage at approximately 80% of the open-circuit voltage with engaging and disengaging the connection between the solar cells and the DC-DC boost converter.

The under-voltage protection circuit is configured to disconnect the Li-ion rechargeable battery cells from the loads whenever when an under-voltage condition is detected on Li-ion rechargeable battery cells.

The overvoltage protection circuit is configured to enable the DC-DC boost converter to allow the solar cells to charge the Li-ion rechargeable battery cells and disable the DC-DC boost converter when an over-voltage (or fully charged) condition of the Li-ion rechargeable battery cells is detected.

BRIEF DESCRIPTION OF THE DRAWINGS

Embodiments of the invention are described in more details hereinafter with reference to the drawings, in which:

FIG. 2A depicts a block diagram of a battery system while

DETAILED DESCRIPTION

In the following description, apparatus and methods of a battery system for a solar-energy powered position tracker are set forth as examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
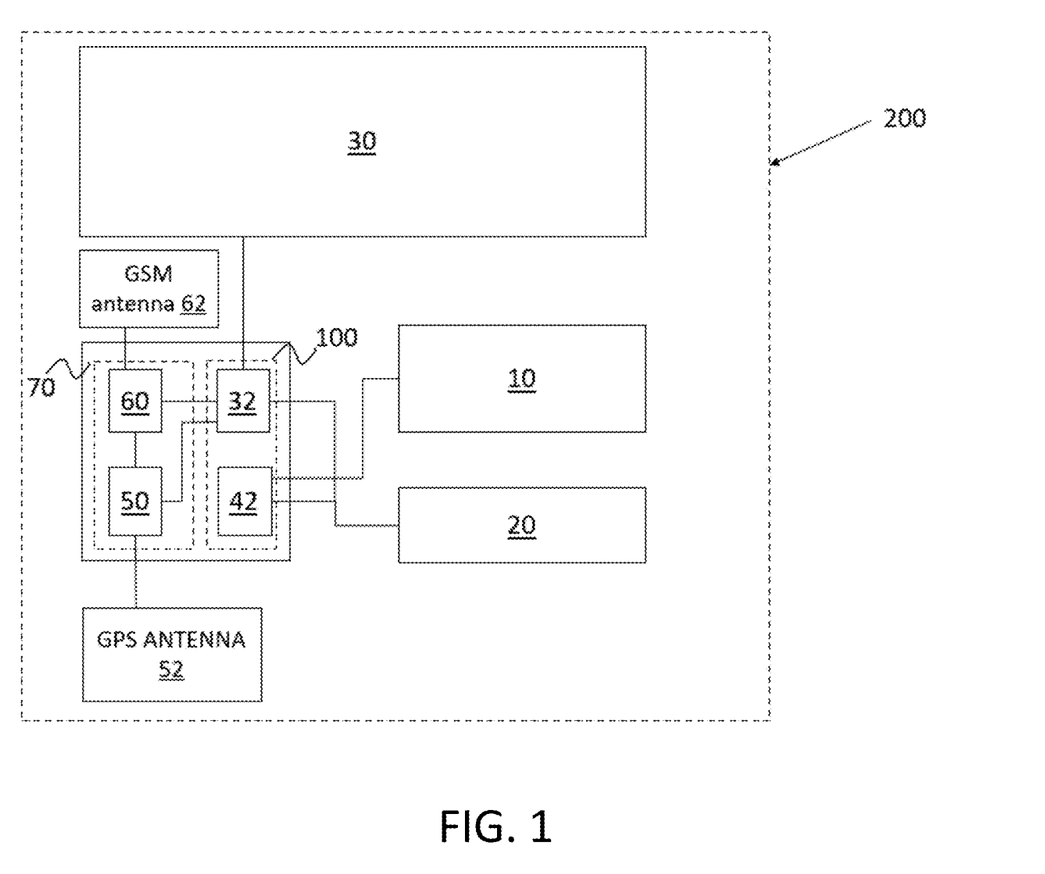
FIG. 1 depicts an exemplary implementation of a solar-energy powered position tracker with a battery system in accordance with one embodiment of the present invention.

Referring to FIG. 1 for the following description. In accordance with one aspect of the present invention, a solar energy powered position tracker 200 that integrates with a battery management system 100 is provided. In accordance with one embodiment of the present invention, the position tracker 200 comprises one or more non-rechargeable primary battery cells 10; one or more rechargeable battery cells 20; one or more solar cells 30; and a battery management system 100. The batteries 10, 20, and 30 and battery management system 100 power one or more loads 70, such as the GPS 50 and/or GSM modules 60 and GPS antenna 52 and GSM antenna 62 of the position tracker 200. Battery management system 100 includes solar cell manager 32 as well as step-up regulator 42.

In one aspect, the rechargeable battery cells 20 function similar to capacitors in that they are capable of discharging a high pulse current from 0.1 C-rate to 15 C-rate of the battery capacity even under extreme operating ambient temperatures ranging from −40° C. to 85° C. In one embodiment, the rechargeable battery cells 20 are lithium-ion (Li-ion) rechargeable battery cells.

The non-rechargeable primary battery cells 10 are high-energy density cells. In one embodiment, the primary battery cells are lithium-thionyl chloride (Li/SOCL$_2$) batteries, which are high-capacity and stable power sources rated for extreme operating ambient temperatures ranging from −55° C. to +85° C. As such, the inventive solar energy powered position trackers are powered by a battery system that is operable even under extreme operating ambient temperatures ranging from −30° C. to +85° C.

Figure 2A:
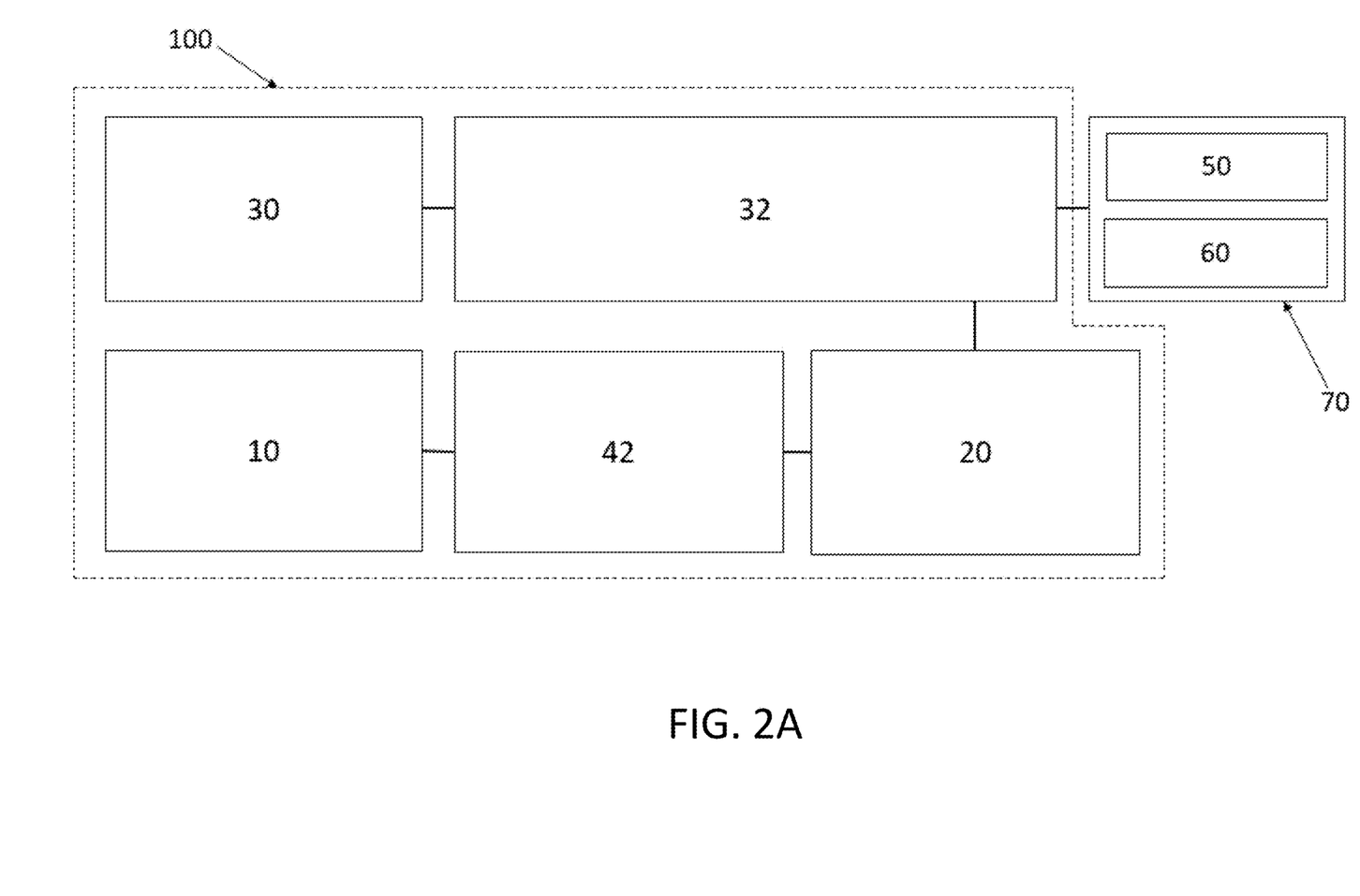

In accordance with another aspect of the present invention, FIG. 2A depicts an overview of the manner in which battery-management system 100 interacts with batteries 10, 20 and 30 for tracker 200. In FIG. 2A the solar cell 30 is managed by solar cell manager 32 which also is connected to load 70 (that includes GPS 50 and GSM 60 modules. Solar cell manager 32 further connects to rechargeable battery 20. A step-up regulator 42 interacts with both rechargeable battery 20 and primary battery 10 so that primary battery 10 is capable of charging the rechargeable battery 20.

Figure 2B:
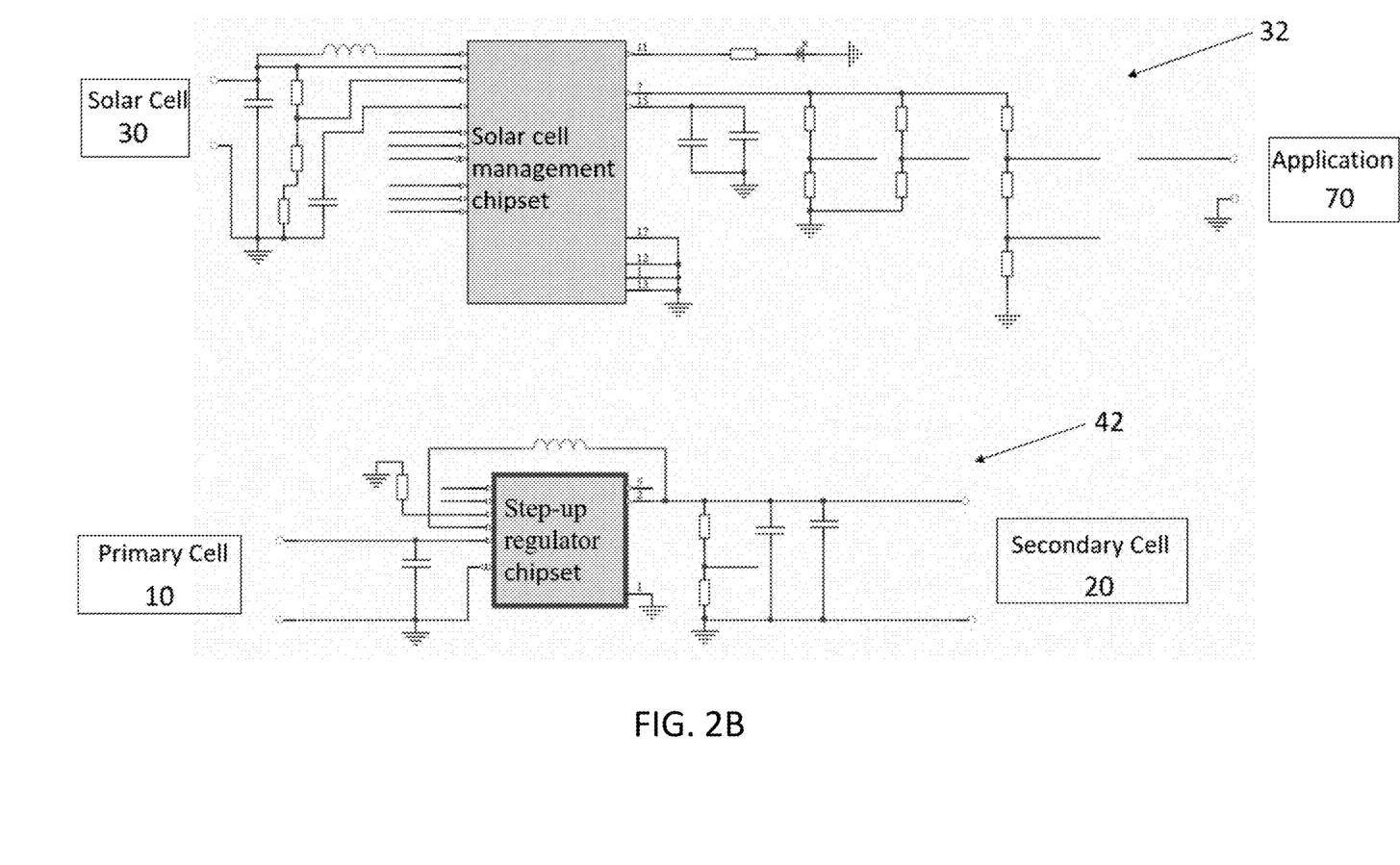
FIG. 2B depicts the corresponding circuit diagrams in accordance with one embodiment of the present invention.

FIG. 2B depicts one implementation of the battery management system 100 including specific examples of circuits for the position tracker 200. It is understood that FIG. 2B is only an example of a circuit that may be used. Other circuits may perform the same functions as described below and may also be used in the present invention. The top portion of FIG. 2B demonstrates solar cell manager 32 which interconnects solar cell 30 and load/application 70. The lower portion of FIG. 2B depicts step-up regulator 42 and its interconnection between primary cell 10 and secondary (rechargeable) cell 20.

The battery management system 100 executes two-stage charging for recharging the Li-ion rechargeable battery cells 20. When the output voltage of the Li-ion rechargeable battery cell 20 falls below a low voltage threshold, the step-up regulator 42 directs a flow of electrical current to charge the Li-ion rechargeable battery cells 20 from the non-rechargeable primary battery cells 10 until the output voltage of the Li-ion rechargeable battery cells reaches a partially-charged voltage threshold indicating that the Li-ion rechargeable battery cells are not yet fully charged. The step-up regulator circuit 42 is then switched to direct a flow of electrical current from one or more solar cells 30 to charge Li-ion rechargeable battery cells 20 for the remaining capacity until they are fully charged.

Figure 3:
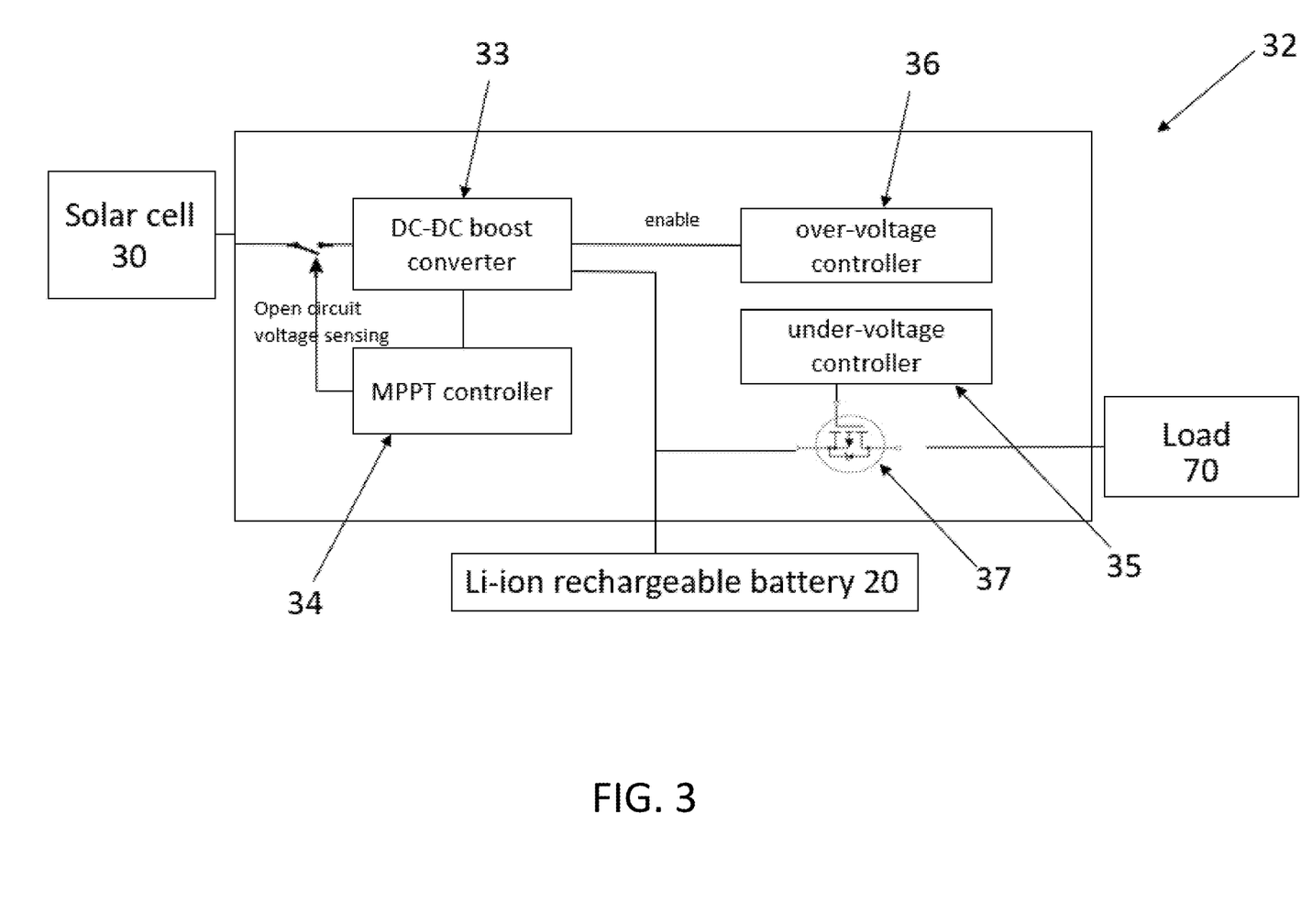
FIG. 3 depicts a block diagram of a solar management and protection circuit of the battery system in accordance to one embodiment of the present invention.

Turning to FIG. 3, details of the solar cell management and protection circuit 32 are depicted. The solar cell management and protection circuit 32 charges the Li-ion rechargeable battery cells 20 in the position tracker 200 by the solar cell 30 in order to power the load 70 (which, in the embodiment of FIG. 1, include GSM antenna 60 and GPS antenna 50). The solar cell management and protection circuit 32 interconnects the solar cells 30, the Li-ion rechargeable battery cells 20, and the GPS 50 and GSM 60 loads. The solar cell management and protection circuit 32 comprises an ultra-low power DC-DC boost converter 33, a programmable dynamic maximum power point tracking controller 34, an under-voltage protection circuit 35, and an overvoltage protection circuit 36.

The DC-DC boost converter 33 is configured for the continuous energy harvesting from a low-power generation source having an output voltage as low as e.g., 130 mV and a starting voltage as low as e.g., 600 mV. The input of the DC-DC boost converter is connected to the solar cell 30, and the connection is controlled by the programmable dynamic maximum power point tracking controller 34. The output of the DC-DC boost converter 33 electrically communicates with the Li-ion rechargeable battery cells 20 in the battery system.

The programmable dynamic maximum power point tracking controller 34 tracks and maintains a maximum power point for the energy transfer from solar cells 30 to the Li-ion rechargeable battery cells 20. First, the programmable dynamic maximum power point tracking controller 34 periodically disengages the electrical pathway between the solar cells 30 and the DC-DC boost converter 33. With the pathway disengaged the MPPT 34 measures the solar cells' open-circuit voltage, using this measurement as a reference value. The MPPT controller then re-engages the connection between the solar cells 30 and the DC-DC boost converter 33 after the measurement. By regulating the energy transfer from solar cells 30 via the DC-DC boost converter 33 to the Li-ion rechargeable battery cells, MPPT 34 may maintain the solar cells' voltage to be approximately 80% of the open-circuit voltage. This regulation is needed because the solar cells' open-circuit voltage constantly varies depending on the sunshine conditions or other incident light source on the solar cells 30.

The under-voltage protection circuit 35 is configured to disconnect the Li-ion rechargeable battery cells 20 from load 70 whenever when an under-voltage condition is detected on Li-ion rechargeable battery cells. The under-voltage protection circuit includes an under-voltage controller 35 and a MOSFET under-voltage protection switch 37 in the electrical connection path between the rechargeable battery cells and the load 70. By controlling the ON and OFF states of the MOSFET under-voltage protection switch 37 via the gate voltage of the MOSFET, the under-voltage controller 36 set the MOSFETS to the OFF state when an under-voltage condition is detected on Li-ion rechargeable battery cells 20.

The overvoltage protection circuit 36 is configured to enable the DC-DC boost converter to allow the solar cells 30 to charge the Li-ion rechargeable battery cells 20 by sending an enable signal to the DC-DC boost converter 33 and disable the DC-DC boost converter 33 when an over-voltage (or fully charged) condition of the Li-ion rechargeable battery cells 20 is detected. This, in turn, prevents the Li-ion rechargeable battery 20 from being damaged due to charging by the solar cells 30 and the primary battery cells 10 and the discharging process by the loads.

Figure 4A:
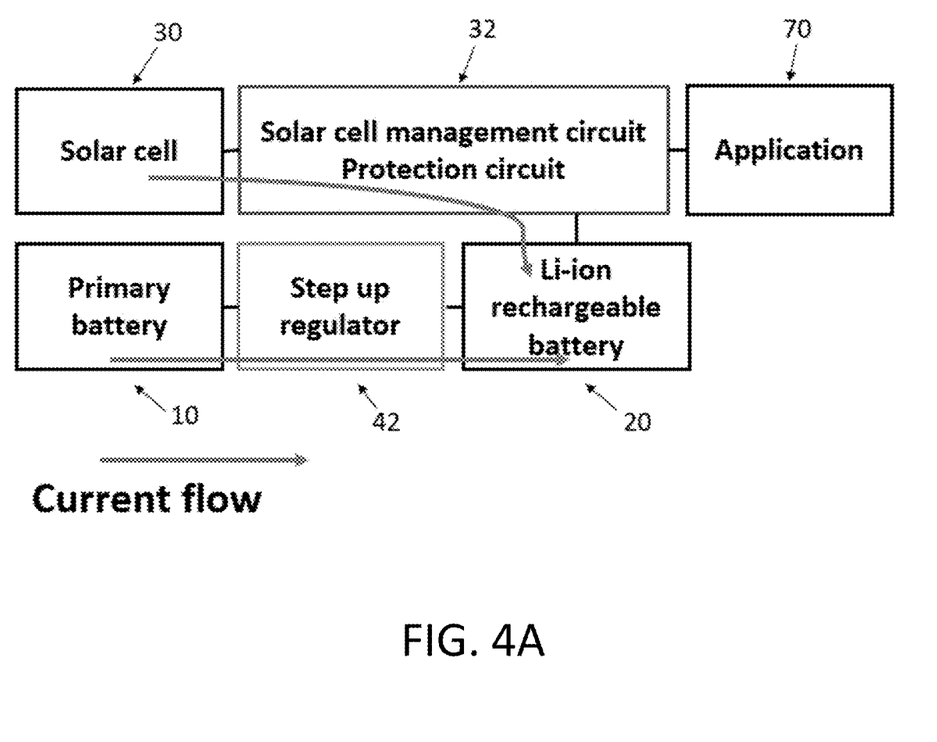
FIGS. 4A, 4B, and 4C depict an illustration of a three-stage charging-discharging process of the battery system in accordance to one embodiment of the present invention.
Figure 4B:
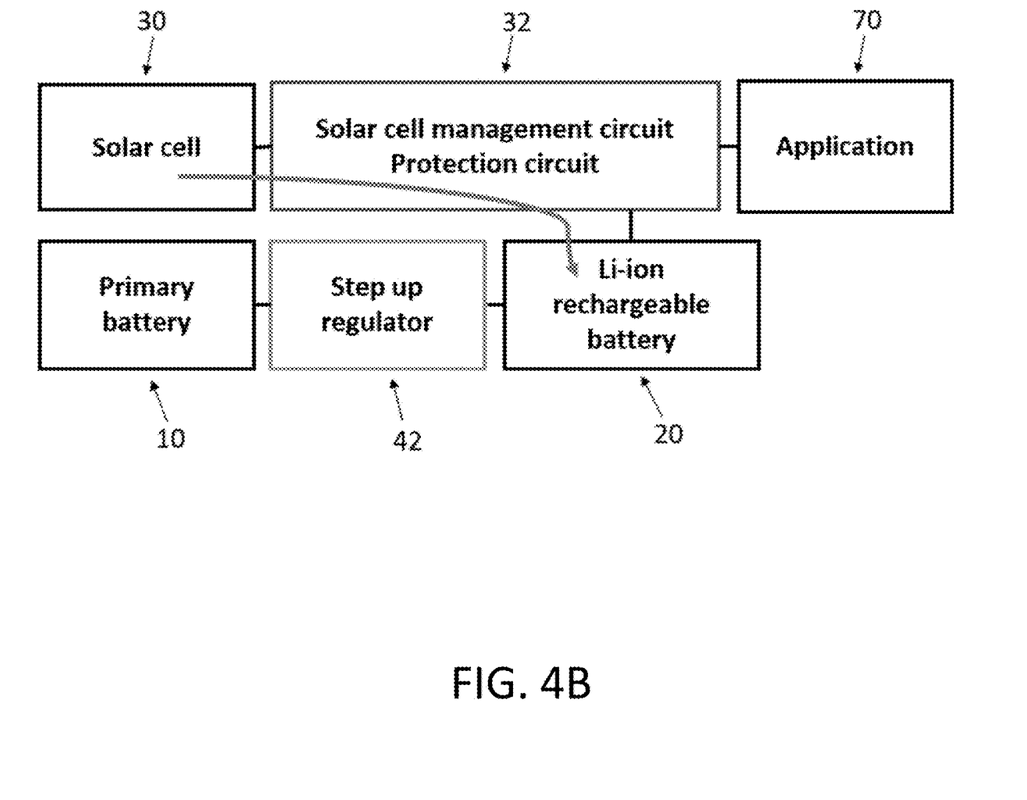
Figure 4C:
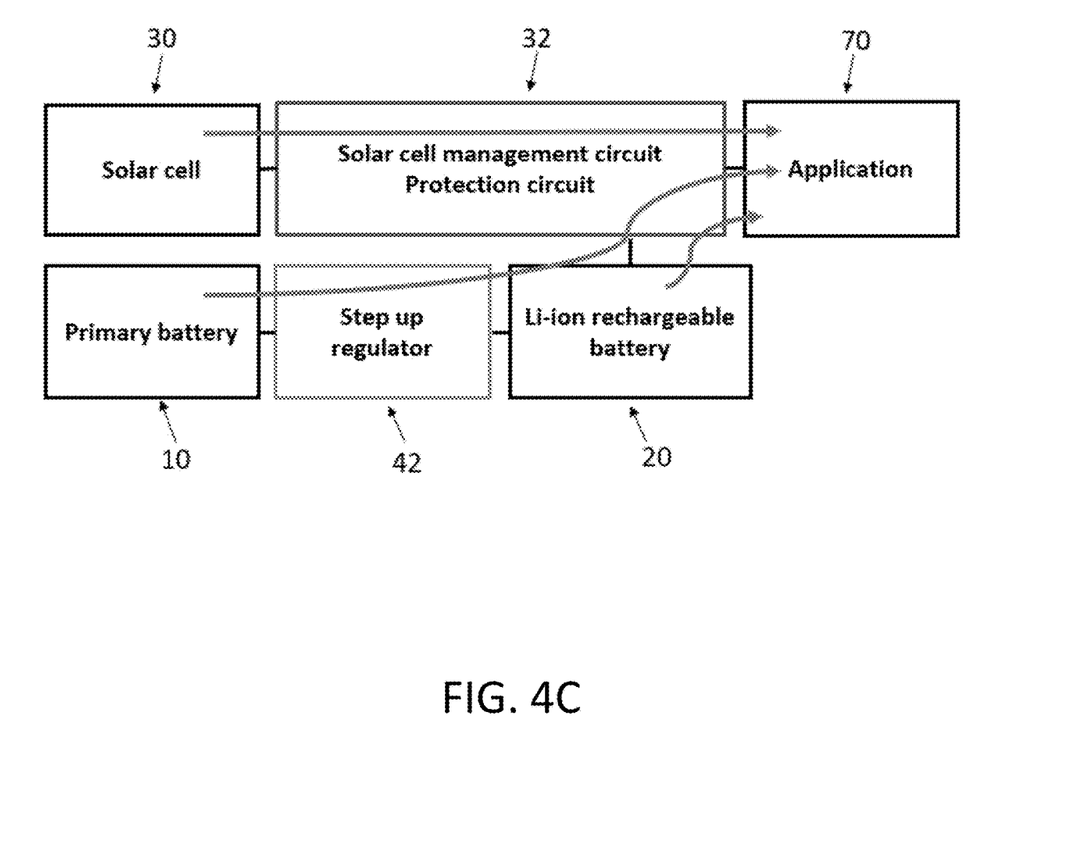

FIGS. 4A-4C depict operation of the system of the present invention. In one aspect, the battery system 100 is configured to execute a three-stage charging-discharging process and the system can switch from one stage to another without following a particular sequence. The three-stage charging-discharging process is illustrated using an exemplary scenario as described below in reference to FIGS. 4A-4C.

Stage 1 (FIG. 4A): When the Li-ion rechargeable battery cells' output voltage falls below a selected low voltage threshold (e.g., 4V), both the step-up regulator circuit 42 and the solar cell management and protection circuit 32 are turned ON; the Li-ion rechargeable battery cells 20 are charged by the non-rechargeable primary battery cells 10 under a high current and also by the solar cells 30. When the Li-ion rechargeable battery cells output voltage rises above a selected partially-charged voltage threshold, the battery system enters Stage 2.

Stage 2 (FIG. 4B): In stage 2, the step-up regulator 42 is switched OFF and the non-rechargeable primary battery cells 10 current path is disengaged from the Li-ion rechargeable battery cells and do not charge the Li-ion rechargeable battery cells. In this configuration, the Li-ion rechargeable battery cells are charged only by the solar cells.

Stage 3 (FIG. 4C): Stage 3 concerns an event in which a high current or high pulse current discharge is demanded by the loads 70. To meet this demand, the solar cell management and protection circuit 32 is switched ON to direct the Li-ion rechargeable battery cells 20 to provide the majority of power to the loads while the solar cells 30 provide limited power to the loads 70. When the Li-ion rechargeable battery cells' output voltage drops below the selected low voltage threshold (e.g., 4V), the step-up regulator circuit 42 is switched ON to direct the non-rechargeable primary battery cells 10 to additionally provide power to the loads 70 to maximize the current output of the battery system for the high-power-demand loads.

EXAMPLES

Figure 6A:
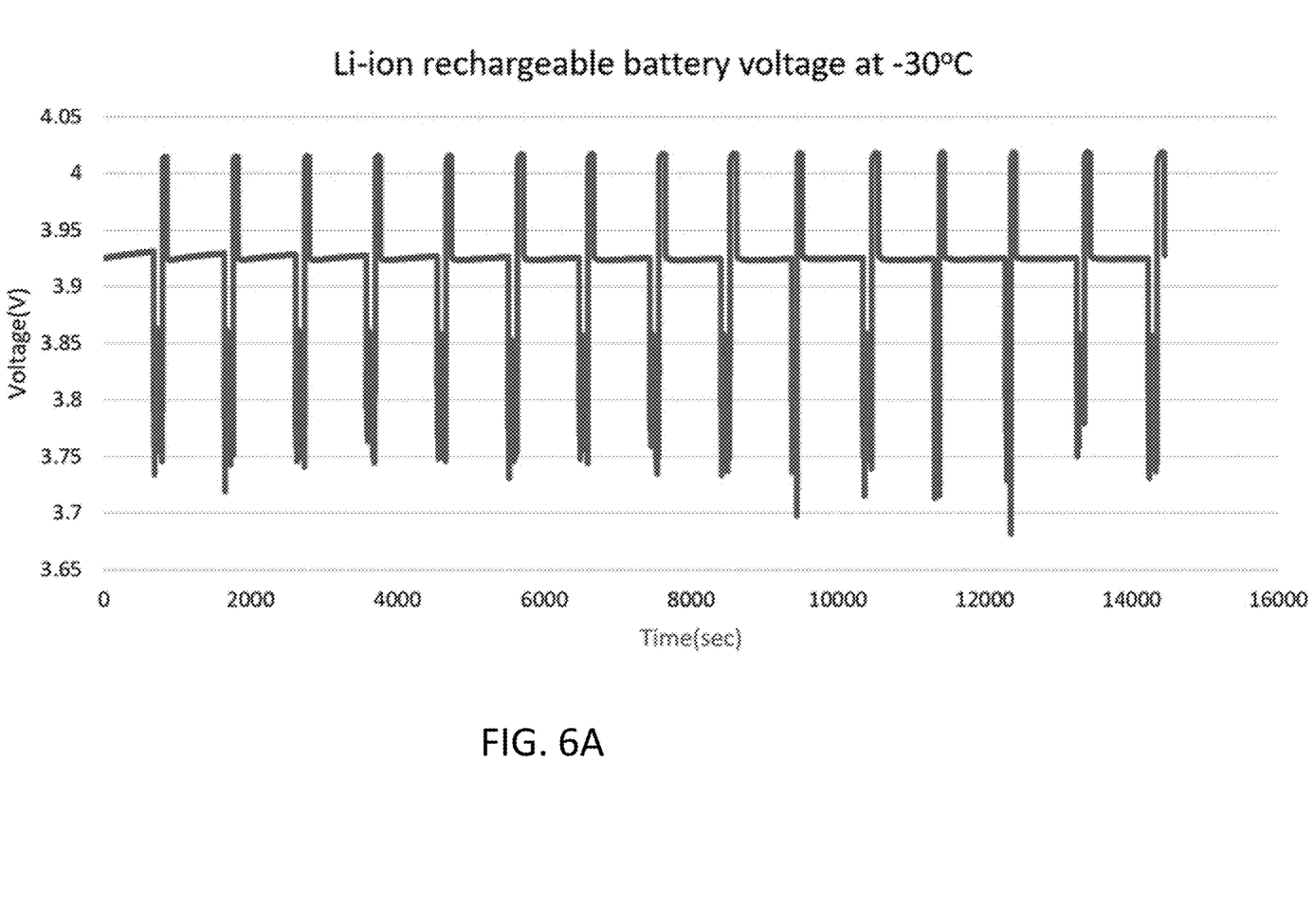
FIGS. 6A, 6B, and 6C show the output voltage of the Li-ion rechargeable battery cells of a battery system in accordance with one embodiment of the present invention tested under the ambient temperatures of −30° C., +25° C., and +85° C. respectively.
Figure 6B:
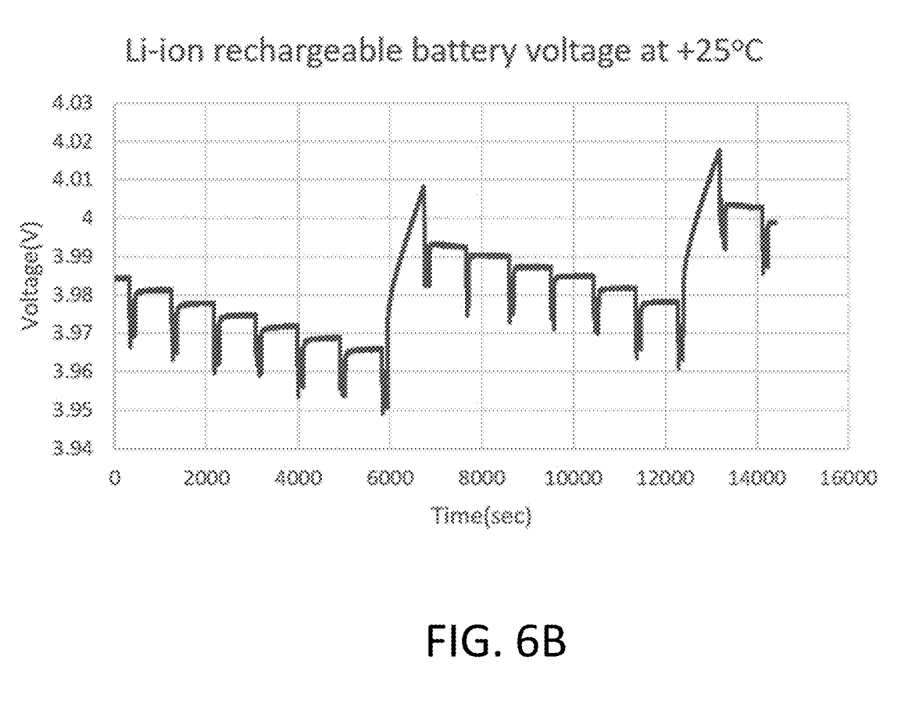
Figure 6C:
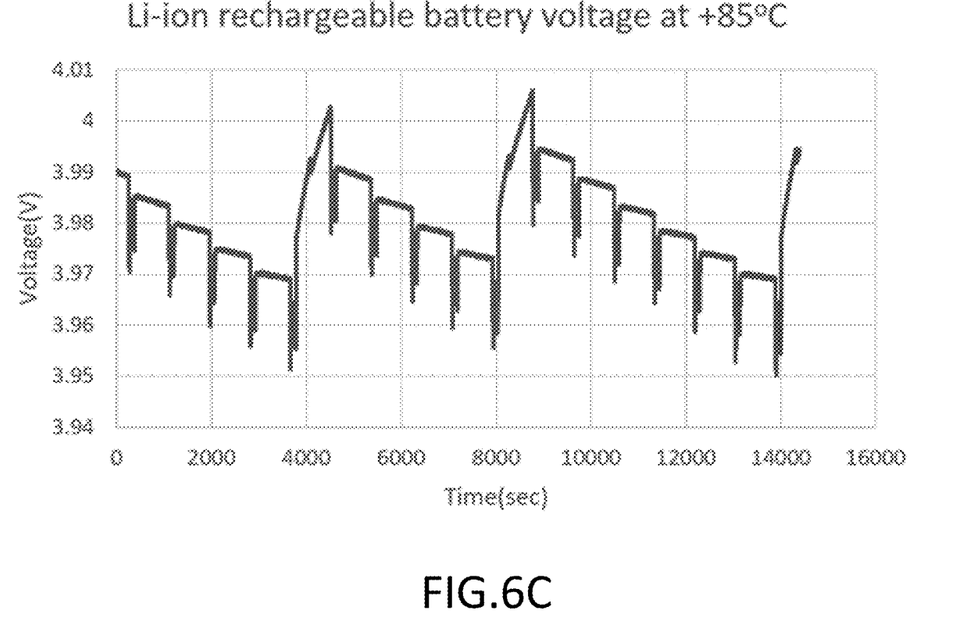

Test 1:

Referring FIGS. 6A, 6B, and 6C for the following description. The output voltage of the Li-ion rechargeable battery cells of a battery system in accordance with one embodiment of the present invention that was incorporated in a position tracker operating under different ambient temperatures including −30° C., +25° C., and +85° C. are shown in FIGS. 6A, 6B, and 6C respectively. The test was conducted with the position tracker being placed in a temperature chamber set at a specific temperature and set to operate for at least 4 hours. The position tracker inside the temperature chamber was connected to a battery tester outside the temperature chamber by a 4-wire cable. The battery tester monitored the Li-ion secondary rechargeable battery cells' output voltage, which was powering the GPS module of the position tracker. The GPS module was configured to wake up every 900 second and the battery system was configured to supply a high pulse current discharge for the GPS module to receive the GPS signal, compute the positioning data, and transmitting the data over cellular network.

Under the ambient temperature of +25° C., the measured Li-ion rechargeable battery cells' output voltage showed a slight voltage drop every 900 second corresponding to the GPS module waking up consuming the high pulse current discharging. The moment the Li-ion rechargeable battery cells' output voltage dropped to 3.95V, the step-up regulator of the battery system was turned ON to have the Li-ion rechargeable battery cells charged back to an output voltage of 4V from the primary battery cells.

Under the ambient temperature of +85° C. environment temperature, the measured Li-ion rechargeable battery cells' output voltage also showed a slight (but more than that in the case of +25° C. ambient temperature) voltage drop every 900 second corresponding to the GPS module waking up consuming the high pulse current discharging. The output voltage reached 3.95V faster than in the case of +25° C. ambient temperature, with then step-up regulator was turned ON to have the Li-ion rechargeable battery cells charged back to an output voltage of 4V from the primary battery cells.

Under the ambient temperature of −30° C., the measured Li-ion rechargeable battery cells' output voltage showed a drop deeper than in the other two cases every 900 second. In this case, the step-up regulator was turned ON at each output voltage drop to have the Li-ion rechargeable battery cells charged every cycle to maintain the Li-ion rechargeable battery cells' output voltage at 4V, assuring sufficient power to the GPS module.

The test showed that the position tracker incorporating the battery system in accordance with an embodiment of the present invention can operate under the ambient temperatures ranging from −30° C. to +85° C. with the battery system providing a stable voltage throughout.

Figure 5A:
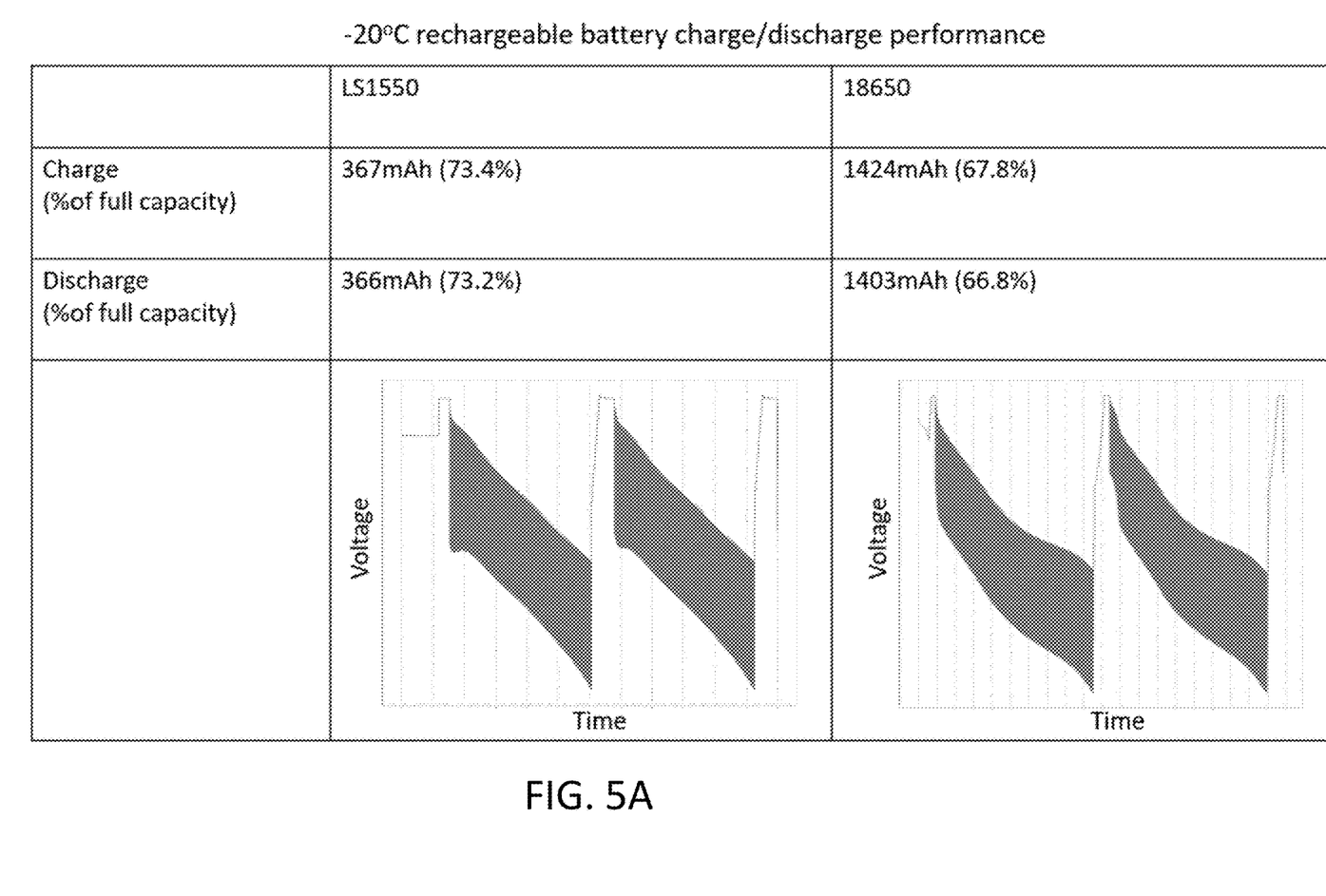
FIGS. 5A, 5B, and 5C show the comparative pulse current discharge results of a typical 18650 and a LS1550 rechargeable battery cell tested under the ambient temperatures of −20° C., −30° C., and −40° C. respectively.
Figure 5B:
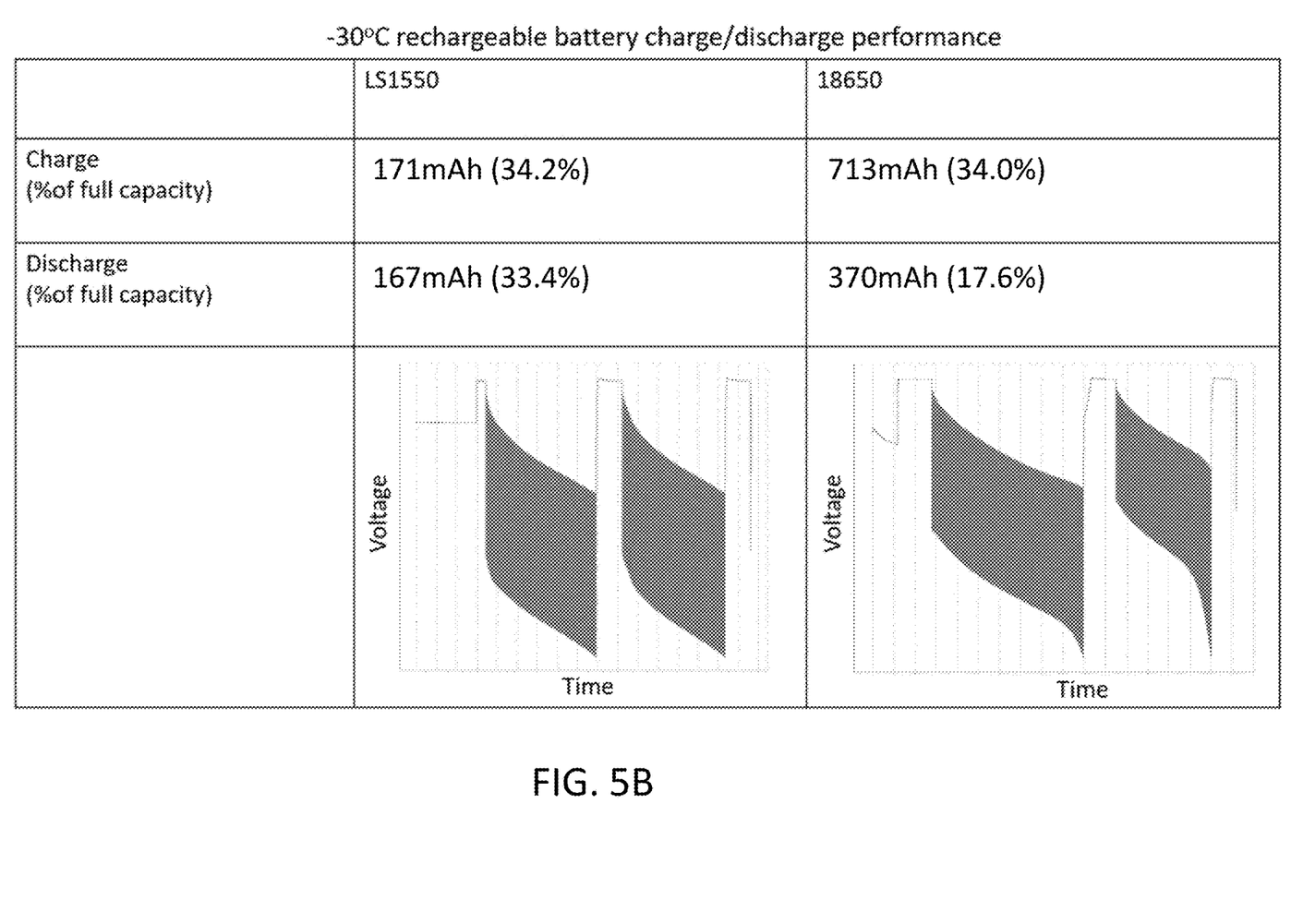
Figure 5C:
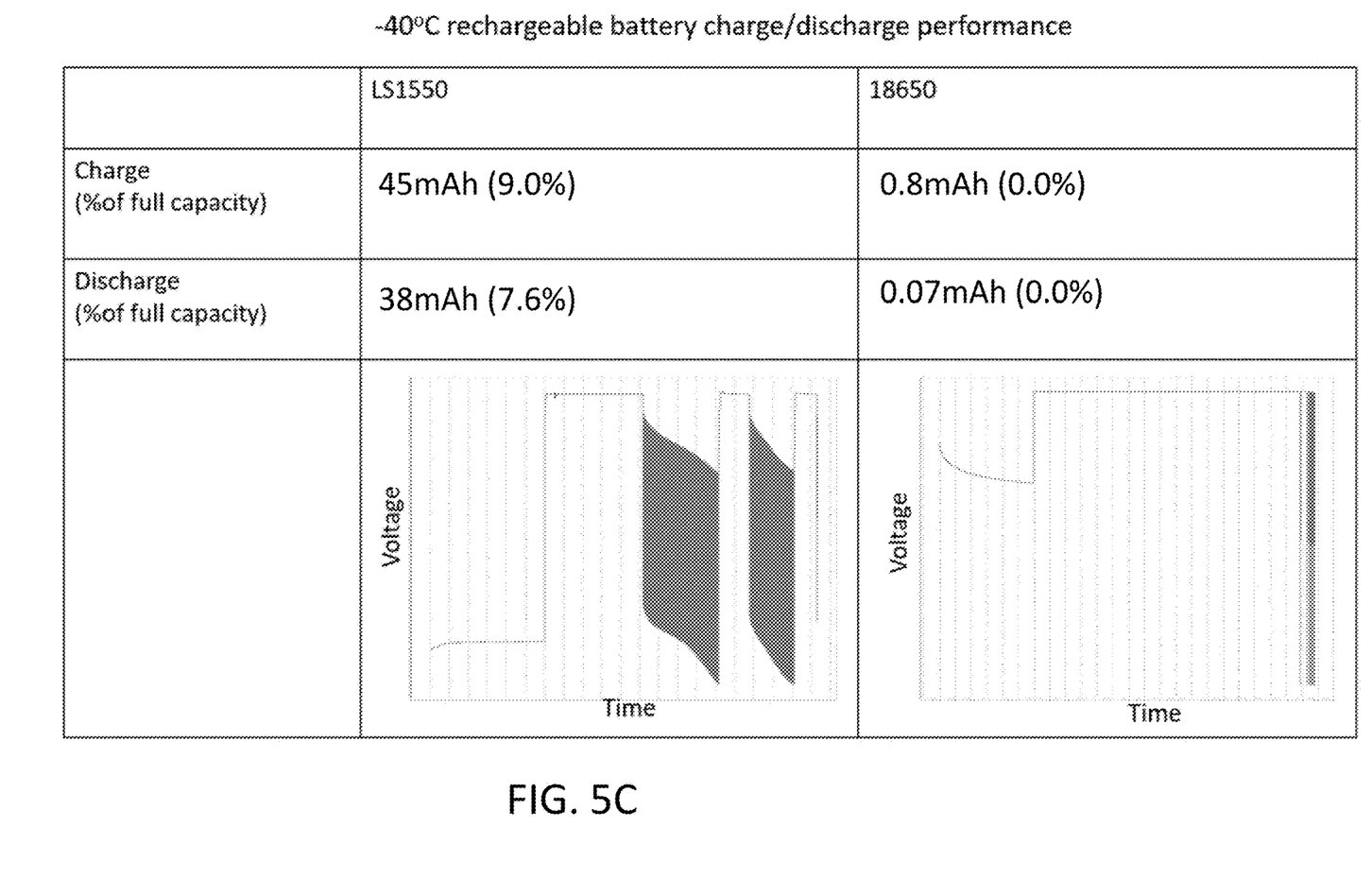

Test 2:

Referring to FIGS. 5A, 5B, and 5C for the following description. The comparative pulse current discharge results of a typical 18650 and a LS1550 rechargeable battery cell tested under the ambient temperatures of −20° C., −30° C., and −40° C. are shown in FIGS. 5A, 5B, and 5C respectively. The 18650 and LS1550 rechargeable battery cells can typically be used to power a position tracker. The test was conducted with each of the battery cells being placed in a temperature chamber set at a specific temperature and set to operate for at least 4 hours. The battery cell inside the temperature chamber was connected to a battery tester outside the temperature chamber by a 4-wire cable. The battery tester charged the battery cell in 200 mA with 20 mA cutoff current and pulse discharge the battery in 1 A and 1 second every 1 minute until the battery cell's output voltage dropped below 3V. The battery tester repeated the charge and pulse discharge cycle twice and measured the charge and discharge capacity of the battery cell under the different operating ambient temperatures.

As can be seen from the test results, under the ambient temperatures of −20° C., the LS1550 battery cell's charge and discharge rates were 73.4% and 73.2% respectively, which were better than 18650's 67.8% and 66.8%. Under the ambient temperatures of −30° C., the LS1550 battery cell's charge and discharge rates were 34.2% and 33.4%, which were better than 18650's 34% and 17.6% respectively. Under the ambient temperatures of −40° C., the LS1550 battery cell's charge and discharge rates were 9% and 7.6% respectively, which were better than 18650's 0% and 0%. Overall, the LS1550 battery cell used in a position tracker would have better performance than one with a typical 18650 operating under extremely low temperature.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A solar-powered position tracker comprising:
   a load including one or more of a GPS module, a GPS antenna, a GSM module, or a GSM antenna;
   a rechargeable battery;
   a non-rechargeable primary battery;
   a solar cell;
   a battery management system for powering the position tracker by controlling the solar cell, the rechargeable battery and the non-rechargeable primary battery, the battery management system charging the rechargeable battery in two stages and including a solar management and protection circuit interconnecting the solar cell and the rechargeable battery;
   wherein the battery management system is configured to execute a charging process for recharging the rechargeable battery from solar cell and protect the rechargeable battery under a high pulse current discharge process to meet a high current or high pulse current discharge demand by the load,
   wherein the two-stage charging process comprises:
      detecting, by the battery management system, whether an output voltage of the rechargeable battery falls below a low voltage threshold;
      when the output voltage of the rechargeable battery falls below the low voltage threshold:
         directing, by the battery management system, a flow of electrical current to charge the rechargeable battery cells from the non-rechargeable primary battery until the output voltage of the rechargeable battery reaches a partially-charged voltage threshold indicating that the rechargeable battery is not yet fully charged; and
         switching, by the battery management system, to direct a flow of electrical current from the solar cell to charge the rechargeable battery for its remaining capacity until the rechargeable battery is fully charged.

2. The solar-powered position tracker of claim 1, wherein the solar management and protection circuit is configured to:
   monitor an open circuit voltage of the solar cell periodically by disconnecting for a short period time the solar cell and a DC-DC boost converter and measuring the solar cell voltage, wherein the DC-DC boost converter being in an electrical connection path between the solar cell and the rechargeable battery;
   during the solar cell being in connection with the rechargeable battery via the DC-DC boost converter, continuously monitors and controls the solar cell voltage at approximately 80% of the open-circuit voltage using a maximum power point tracking (MPPT) controller to achieve a maximum power output of the solar cell.

3. The solar-powered position tracker of claim 1, wherein the solar management and protection circuit is configured to:
   disconnect the rechargeable battery from the load when an under-voltage condition is detected; and
   disable a charging of the rechargeable battery by the solar cell when an over-voltage condition is detected.

4. The solar-powered position tracker of claim 1, wherein the high pulse current discharge process comprises:
   directing the rechargeable battery to provide a majority of power to the load and the solar cell to provide a limited power to the load;
   when the output voltage of the rechargeable battery falls below the low voltage threshold:
      directing the non-rechargeable primary battery to provide power to the load.

5. The solar-powered position tracker of claim 1, wherein the rechargeable battery is a lithium-ion battery.

6. The solar-powered position tracker of claim 1, wherein the non-rechargeable primary battery is a lithium-thionyl chloride battery.

7. The solar-powered position tracker of claim 1, wherein the a battery management system includes a step-up regulator circuit.

8. The solar-powered position tracker of claim 1, wherein the solar management and protection circuit includes a DC-DC boost converter, a programmable dynamic maximum power point tracking controller, an under-voltage protection circuit, and an overvoltage protection circuit.

9. The solar-powered position tracker of claim 8, wherein the programmable dynamic maximum power point tracking controller periodically disengages an electrical pathway between the solar cells and the DC-DC boost converter to measure an open-circuit voltage of the solar cell.

\* \* \* \* \*